United States Patent [19]

Godard

[11] 4,125,802

[45] Nov. 14, 1978

[54] METHOD AND APPARATUS FOR CHARGING STORAGE BATTERIES

[75] Inventor: Pierre Godard, Tremblay les Gonesse, France

[73] Assignee: Saft-Societe des Accumulateurs Fixes et de Traction, Romainville, France

[21] Appl. No.: 725,286

[22] Filed: Sep. 21, 1976

[30] Foreign Application Priority Data

Sep. 26, 1975 [FR] France .............................. 75 29664

[51] Int. Cl.² .............................................. H02J 7/10
[52] U.S. Cl. ........................................ 320/35; 320/22
[58] Field of Search ............. 320/6, 35, 36, 39, 22-24

[56] References Cited

U.S. PATENT DOCUMENTS 3,599,071   8/1971   Lapuyade et al. ..................... 320/35

Primary Examiner—Robert J. Hickey
Attorney, Agent, or Firm—Kenyon & Kenyon, Reilly, Carr & Chapin

[57] ABSTRACT

Method and apparatus for charging storage batteries in which the charging rate is varied as a function of temperature are disclosed. The battery temperature and ambient temperature are sensed and compared. When the battery temperature is less than the ambient temperature plus a first temperature difference, a first charging rate is provided; when the battery temperature is greater than the ambient temperature plus the first temperature difference but less than the ambient temperature plus a second temperature difference which is greater than the first temperature difference, an intermediate charging rate is provided which varies with the comparison of the battery and ambient temperatures between the first charging rate and a second charging rate which is less than the first charging rate; and when the battery temperature is greater than the ambient temperature plus the second temperature difference, the second charging voltage is provided. Alternatively, charging may be cut-out instead of proceeding at the second charging rate. The method disclosed herein may advantageously be used to charge all types of storage batteries.

31 Claims, 10 Drawing Figures

METHOD AND APPARATUS FOR CHARGING STORAGE BATTERIES

BACKGROUND OF THE INVENTION

1. Field of the Invention

The present invention relates to a method and apparatus for charging storage batteries in which the charging voltage is varied as a function of temperature.

2. Description of the Prior Art

Constant voltage charging methods are known and are particularly applicable to the charging of sealed or semi-sealed batteries having electrodes with thin sintered supports. These methods either use two voltage steps, one high and the other low, which are used respectively for main charging and for maintaining charge, or a single voltage step is used with automatic cut-out thereof. One such method is disclosed in U.S. Pat. No. 3,599,071, which is hereby incorporated herein by reference. In these known methods, when the temperature of the battery, TB, is less than or equal to the sum of the ambient temperature, TA, plus a first temperature difference, $\Delta T1$, charging takes place at the high voltage step. At or near termination of charging, however, the temperature of the battery rises and when it reaches and exceeds the ambient temperature TA plus a second temperature difference, $\Delta T2$, charging at the high rate is prevented. The values $\Delta T1$ and $\Delta T2$ can be, for example, respectively about 6° C. and about 12° C. The change-over from one voltage step to the other under the influence of temperature is immediate, i.e., the switching is substantially instantaneous. As long as the ambient temperature is less than 20° C., the regulation thus obtained brings about a correct and reproducible stabilization of the charging current of a battery being charged at constant voltage at or near the termination of charging. The same does not apply above 20° C., however, where the battery electromotive force varies to a great extent from battery to battery or even for a single battery at different periods in its life. The result of this is that the charging currents delivered when the high voltage is applied can be too low or too high. If they are too low, the battery does not terminate charging within the expected time; if they are too high, there is a danger of thermal runaway. The present invention obviates these prior art drawbacks and disadvantages and provides additional advantages which will be more apparent hereinafter.

SUMMARY OF THE INVENTION

The present invention is embodied in and carried out by a method and circuits for charging storage batteries in which the charging rate is varied as a function of temperature. The battery temperature and ambient temperature are sensed and compared. When the battery temperatures is less than the ambient temperature plus a first temperature difference, a first charging rate is provided; when the battery temperature is greater than the ambient temperature plus the first temperature difference but less than the ambient temperature plus a second temperature difference which is greater than the first temperature difference, an intermediate charging rate is provided which varies with the comparison of the battery and ambient temperatures between the first charging rate and a second charging rate which is less than the first charging rate; and when the battery temperature is greater than the ambient temperature plus the second temperature difference, the second charging voltage is provided. Alternatively, charging may be cut out instead of proceeding at the second charging voltage. Preferably, the intermediate charging voltage varies inversely with the comparison of the battery and ambient temperatures.

In accordance with the invention, the charging voltage begins to decrease as soon as the temperature of the battery reaches ambient temperature TA plus the first temperature difference $\Delta T1$, and the charging current correspondingly decreases. The temperature of the battery, thus, increases more and more slowly until the second, lesser charging rate is reached or until charging is cut out.

According to one advantageous embodiment, the charging rate decreases linearly with respect to temperature according to the equation, $$V = -a(TB - TA) - b,$$

$a$ and $b$ being constants and $V$ being the charging voltage.

According to another embodiment, the charging rate varies in accordance with a function which is linear in relation to the rate of variation of the temperature of the battery with time, the voltage also decreasing with increasing temperature but according to the equation, $$V = -c[d(TB - TA)/dt] + d,$$

$c$ and $d$ being constants and $t$ being time.

According to another embodiment, $\Delta T1$ is chosen equal to zero, i.e., the charging rate begins to decrease as soon as the temperature of the battery rises above ambient temperature. Thus, it is possible to achieve stabilization of the battery temperature without providing for a second, lesser charging rate step.

It may be preferable, in certain cases, to provide a delay which stops the charging or maintains it at the second, lesser charging rate step constituting a trickle charge. This delay may be controlled in known manner by means of the capacity by which the battery has previously been discharged. Of course, the inhibiting effect of this delay is ceased when the battery is discharged again.

Further in accordance with the invention, devices and circuits are provided for practicing the methods according to the invention.

These and other aspects of the present invention will be more apparent from the following detailed description of the invention when considered in conjunction with the accompanying drawing.

BRIEF DESCRIPTION OF THE DRAWING

The invention is illustrated by way of example and not limitation in the figures of the accompanying drawing in which like numerals refer to like parts and in which.

DESCRIPTION OF THE PREFERRED EMBODIMENTS

Figure 1:
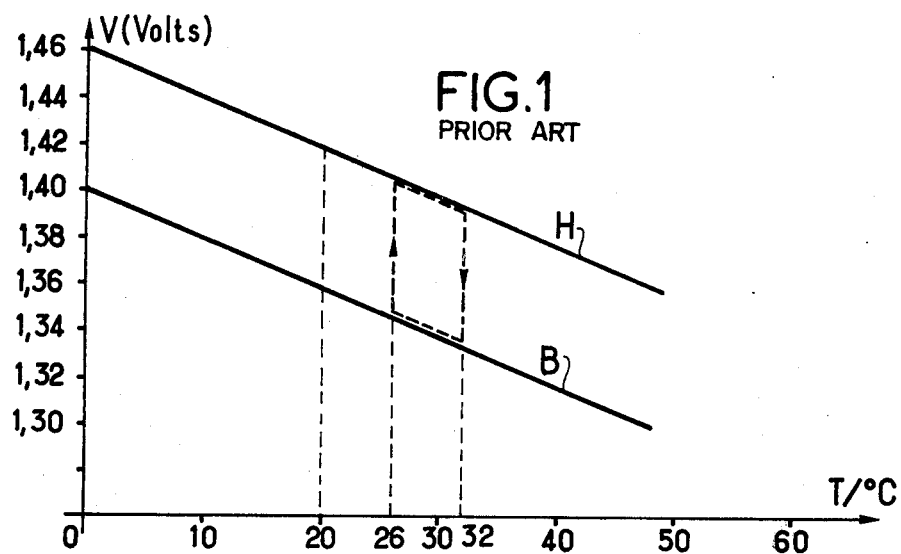
FIG. 1 is a graph showing the variation in the charging voltage V (volts) of a storage battery as a function of temperature T (° C.) according to a known prior art charging method.

In FIG. 1 is shown a plot of the charging voltage of a nickel-cadmium alkaline storage battery as a function of the battery temperature when charged by a known method such as described, for example, in the aforementioned U.S. patent. The abscissa axis shows the temperature T of the battery and the ordinate axis shows the charging voltage V per cell. Part of a typical charging cycle is shown in broken lines. The charging method is a conventional constant voltage method with two voltage levels one of which corresponds to charging at a first rapid rate (high level H) and the other of which corresponds to charging at a second slow rate (low level B). Charging at the rapid rate is suitable when the battery is discharged in order to obtain optimum battery conditions as quickly as possible, both for a battery in a floating circuit or for one in a stand-by circuit which is used to compensate for power interruptions, reductions, malfunctions, etc. of the line or primary supply. Charging at the slow rate is suitable for a substantially charged battery in which it is required to complete charging or to compensate for self-discharging, particularly for sealed storage batteries. As will be seen in FIG. 1, the value of the voltage charging levels varies according to the temperature of the battery in order to prevent thermal runaway at or near the termination of charging of the sealed storage cells. Designating ambient temperature to be 20° C., a first temperature difference, $\Delta T1$, to be 6° C., a second temperature difference, $\Delta T2$, to be 12° C., and the battery temperature subsequent to a discharge to be 26° C., or less, charging proceeds as follows. With the battery discharged and at a temperature 26° C., or less, the charger operates at the high level H until the battery heats up, which occurs at or near the termination of charging. When the temperature of the battery reaches 32° C., the charger changes over to the low level B until the temperature of the battery has again reached 26° C. when the charger changes back to the high level H. The charger also has a time delay which ensures that the battery, once charged, is kept at a maintenance or trickle charge. This time delay can, for example, be controlled as disclosed, for example, in U.S. Pat. No. 3,668,418 by the discharge of a small storage cell charged from the battery, which makes it possible to ensure a complete charging of the battery during the discharging time of the small storage cell.

As will be seen in FIG. 1, the charge voltage follows a parallelogram path, two of whose sides are parallel to the ordinate axis.

Figure 2:
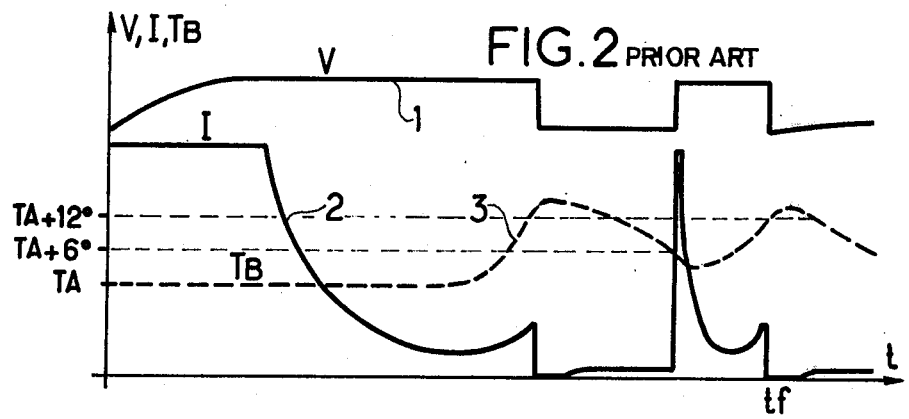
FIG. 2 is a set of curves showing variation with time $t$ of the charging voltage V, of the charging current I and of the temperature TB of a battery charged according to a known prior art method.

Referring now to FIG. 2, the waveshapes of the charging voltage V (waveshape 1) and the charging current I (waveshape 2), both as a function of time, and the plot of the temperature of the battery TB (curve 3) above ambient temperature TA, also as a function of time, are shown. As shown by waveshape 1, at the beginning of charging a discharged battery at ambient temperature, the voltage is limited by the maximum output rate of the charger and the charge is, therefore, a constant current charge at, for example, a current of C/2, i.e., half the rated capacity of the battery. As the battery becomes charged, its counter EMF increases and the charging voltage increases to the high level H. At this time, the charging current then begins to decrease until the termination of charging is almost reached. The temperature of the battery then increases, reducing its internal resistance and permitting the current to increase again until the temperature of the battery reaches 20° C. + 12° C. = 32° C., when the charging voltage changes over to the low level B. The current is then very low and this situation persists until the temperature of the battery has fallen back to 26° C., when the charge voltage is changed back to the value of the high level H. However, this changing to the high charging voltage can cause a current peak, as shown in FIG. 2, which could damage the battery. The cycle repeats, until the end of a time delay which prevents a further return to the high level (point $tf$).

Figure 4:
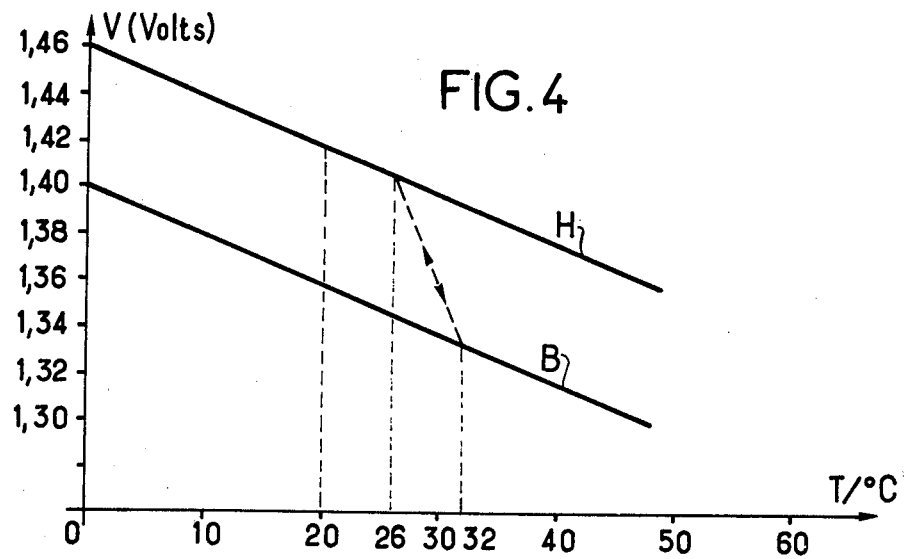
FIG. 4 is a graph similar to FIG. 1 showing the variation of the charging voltage V (volts) of a storage battery as a function of temperature T (° C.) using a charging method according to the present invention.
Figure 5:
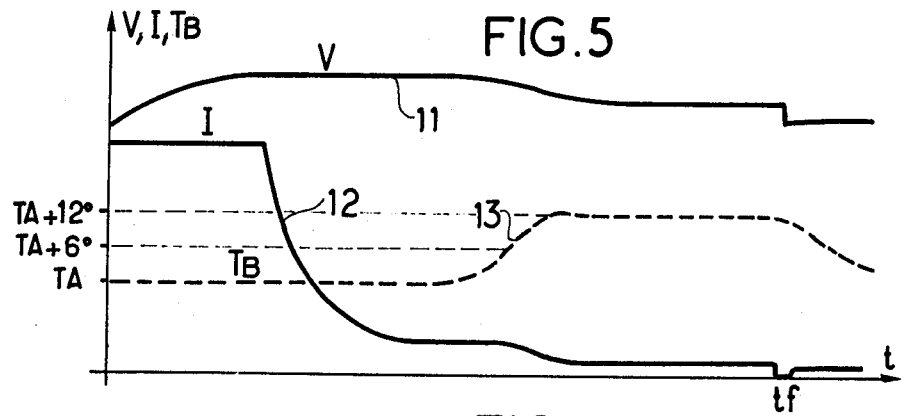
FIG. 5 is a set of curves similar to FIG. 2 showing the variation of V, I, and TB with time for a battery charged by a method according to the present invention.

In contrast, referring to FIGS. 4 and 5, the charging voltage V of a battery as a function of the temperature T (FIG. 4), and the charging voltage waveshape (curve 11), the charging current I (curve 12) and the temperature of the battery TB (curve 13) all as a function of time $t$, are shown. It will be seen that when the temperature of the battery exceeds 26° C., the voltage decreases instead of jumping suddenly to the low level B. Each intermediate temperature between 26° C. and 32° C. corresponds to an intermediate voltage between the high level voltage H and the low level voltage B. In FIG. 5, the voltage waveshape 11 begins by following the same path as waveshape 1 in FIG. 2, and likewise so does the current whose waveshape 12 is similar to waveshape 2 in FIG. 2. But once the temperature rises above 26° C., instead of remaining at the same voltage until the temperature reaches 32° C., the voltage lowers progressively so that a rising of the current is prevented as shown by waveshape 12, in contrast to the rise of the current as shown by waveshape 2. The voltage is reduced progressively until the low level voltage B is reached and voltage and current undulations are greatly reduced. If the temperature of the battery at the low charge level were to fall below 32° C., the voltage would rise progressively along the curve shown in FIG. 4, and this would avoid any current peaks before the end of the time (point $tf$).

Of course, instead of changing over to the low voltage B, charging could be completely interrupted or cut out and operation would be basically the same as described hereinbefore.

In the example described and shown with reference to FIG. 4, the slope of the decreasing linear function, $V = -a(TB - TA) + b$, is 2 mV per degree per storage cell. Further according to the invention, if the reduction in voltage begins as soon as the temperature of the battery rises above ambient temperature, and if a greater slope is chosen, e.g., greater than 12 to 15 mV per degree per storage cell, a stabilization of the temperature of the battery at a difference of 5 to 6° C. above ambient temperature can be reached and current may be maintained at a voltage which may be that of the low level. This, thus, dispenses with the need for a delay and this embodiment is particularly suitable for applications where the battery is used in a stand-by circuit, i.e., where the battery is used when there is a line power interruption or reduction.

Figure 3:
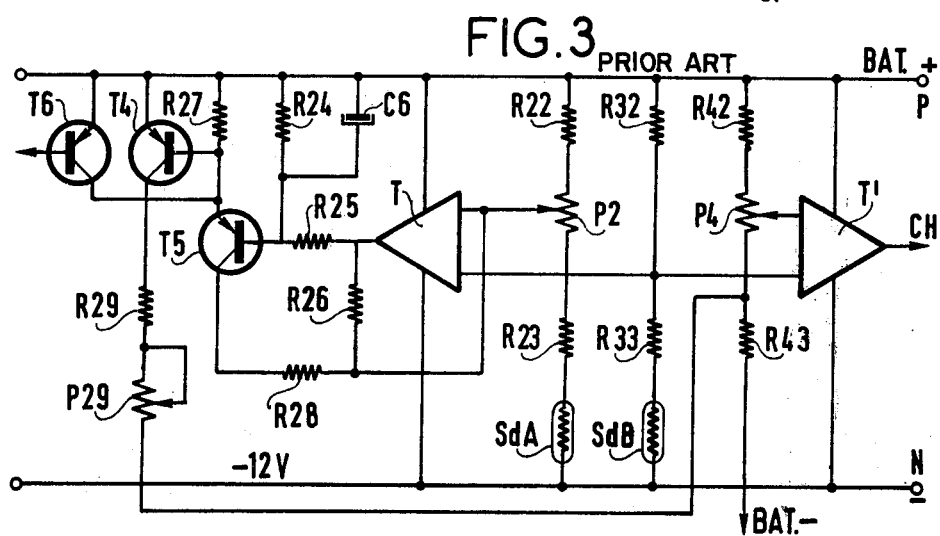
FIG. 3 is a circuit diagram of a known prior art charging control device.
Figure 6:
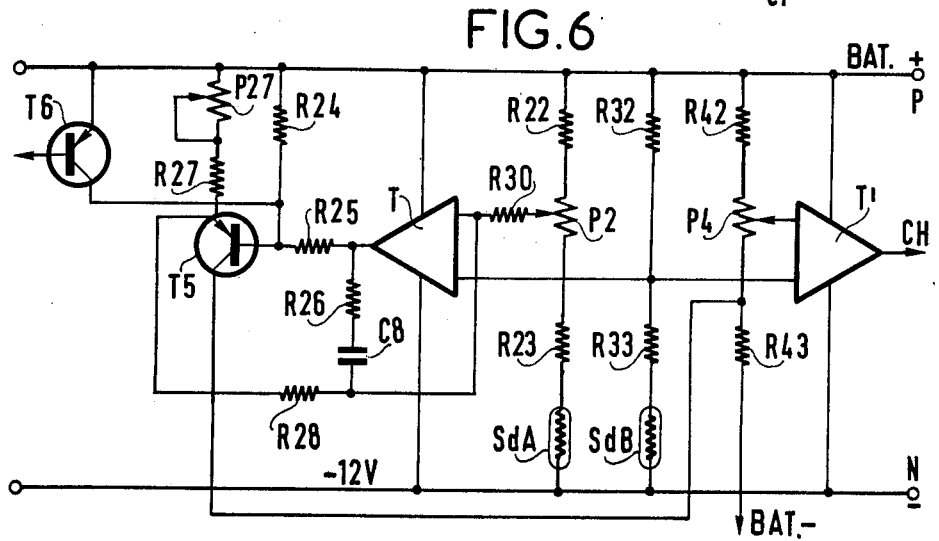
FIG. 6 is a circuit diagram of a charging control device according to one embodiment of the present invention.

FIGS. 3 and 6 show, respectively, circuit diagrams of devices according to prior art and according to the present invention.

FIG. 3 shows the temperature control device which provides the curves shown in FIGS. 1 and 2. An amplifier T receives on one input a voltage taken from a first voltage divider comprising resistors R 32, R 33 and SdB, SdB being a resistance varying linearly with the temperature and being placed in contact with the battery (referred to as the battery probe). This first divider is fed by a constant voltage source shown only by its terminals P and N and whose positive terminal P is connected to the positive terminal of the battery. A second voltage is supplied to a second input of amplified T by a second divider comprising resistances R 22 and R 23, potentiometer P2 and resistance SdA, SdA being an ambient temperature probe having a linear characteristic and being fixed to a body having a thermal inertia comparable to that of the battery, as more fully described in U.S. Pat. No. 3,599,071. The second divider is also connected across the regulated voltage source P, N. The output of amplifier T is connected through resistor R 25 to the base of transistor T 5 whose collector is connected to the second input of amplifier T through resistor R 28. The emitter of transistor T 5 is connected directly to the base of transistor T 4 and to the positive line common to the battery and to the constant voltage source through resistor R 27. The emitter of transistor T 4 is also connected to the said positive line, and its collector is connected through resistor R 29 and through potentiometer P 29 to a voltage divider connected across the battery terminal, BAT− and BAT+, and constituted by resistors R 42, and R 43 and potentiometer P4. Resistors R 26, R 25 and R 24, as well as a capacitor C 6, comprise the usual bias components of transistor T 5 and of amplifier T. Another transistor T 6, whose base is connected to a delay device (not shown), has its collector connected to the base of transistor T 4 and its emitter connected to the common positive line. A second amplifier T' receives, on a first output, a voltage taken from the divider comprising the battery probe SdB and, on a second input, a voltage taken from the slider of potentiometer P 4 and controls a constant voltage charger CH (not shown).

The operation of this device of FIG. 3 is as follows. During the period of the time delay (battery discharged), transistor T 6 is blocked. Amplifier T responds to the difference between the resistances of the probes SdA and SdB to switch on transistor T 5 and thereby saturate transistor T 4. The collector current of transistor T 5, drawn from the negative line of the regulated supply via resistor R 28, is added to that flowing through potentiometer P 2, resistor R 23 and probe SdA. The positive feedback caused by this flow of collector current during charging at high level, and corresponding lack of collector current when not charging at high level, switches the operative temperature difference from 12° C. (ΔT2) (for stop charging at high level) to 6° C. (ΔT1) (for start charging at high level). In other words, the flow of collector current (or lack of collector current) in the voltage divider chain SdA to R 22 provides the hysteresis shown in FIG. 1. Amplifier T' is switched hard on or off under the control of transistor T 4 via resistance 29. Amplifier T' controls the battery charger in known manner as a function of the difference between the reference voltage constituted by the battery probe SdB, and the voltage taken from the voltage divider across the battery. When the time delay ends, transistor T 6 is unblocked to thereby prevent changeover to the high level of charging by blocking transistor T 4.

FIG. 6 contains the same components with the same reference numerals as FIG. 3 with the following differences. Transistor T 4 is removed. Transistor T 5 still has its emitter connected to the common positive line by resistor R 27 and potentiometer P 27, but resistor R 28 is connected to its emitter and a capacitor C 8 is interposed between the common point of resistor R 28 and of the second input of amplifier T, and resistor R 26. A resistor R 30 is interposed between potentiometer P 2 and the said second input. The collector of transistor T 5 is connected to the battery voltage divider. Transistor T 6 now controls transistor T 5, its collector being connected to the base of T 5. In this case, resistor R 28, instead of providing positive feedback, provides negative feedback which limits the gain of amplifier T. As long as the resistance of the battery probe SdB is less than the resistance of the ambient temperature probe SdA increased by a resistance ΔR which corresponds to the difference in temperature of 6° C., the output of amplifier T is at the potential of the negative line N of the constant voltage source (here −12 volts). Transistor T 5 delivers its maximum current to the divider R 43, P 4, R 42 and amplifier T' to cause charging to be at the high level H. As soon as the difference in temperature between the ambient temperature and the battery exceeds 6° C., the output potential of amplifier T becomes more positive. Due to the negative feedback via R 28, the output potential of amplifier T passes linearly from −12 volts to −2 volts for a rise in temperature lying between 6° C. and 12° C. (ΔT1 and ΔT2). Accordingly, it may be said that the output voltage rate varies inversely with temperature. The current delivered by transistor T 5 decreases linearly and passes from maximum current to zero. The voltage delivered by the charger passes linearly under control, in known manner, of the output of T' from the high level to the low level. The passage in the reverse direction occurs in reverse manner and the rising slope is superimposed on the descending slope in FIG. 4.

Figure 7:
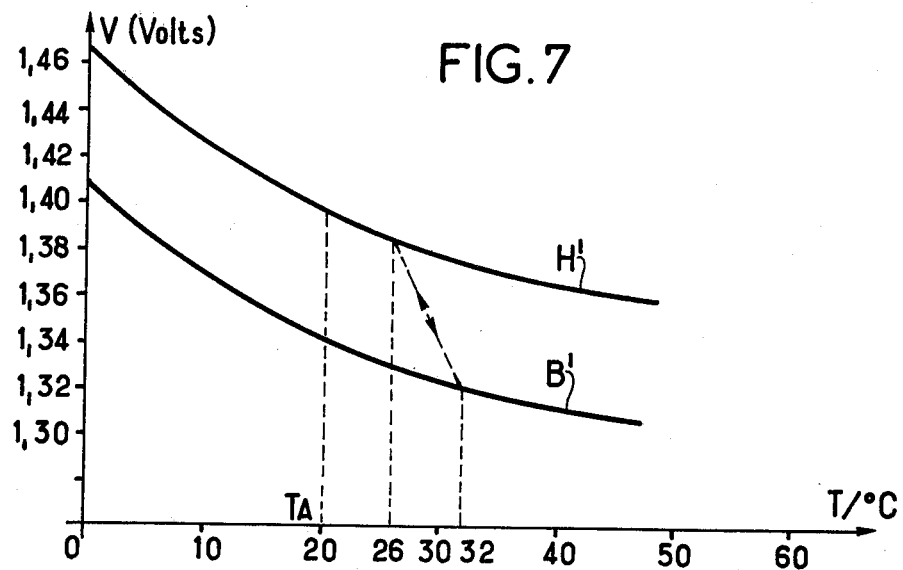
FIG. 7 is a graph similar to FIGS. 1 and 4 showing the variation of the charging voltage V of a battery as a function of temperature I using a variant of the method according to the invention.

FIG. 7 shows the charging voltage plotted as a function of temperature T in which the high and low levels referenced H' and B' are non-linear in contrast to the linear relationship of FIGS. 1 and 4. This non-linear relationship is obtained with the device shown in FIG. 8, which comprises the same components as in FIG. 6 with the differences that there are two battery probes, SdBt and SdBu, and two reference dividers one of which (SdBt) is connected to the first output of amplifier T and the second of which (SdBu) is connected to amplifier T'. An extra probe is necessary, for while probe SdBu may vary non-linearly with temperature, probes SdA and SdBt must be linear in order to maintain a constant difference in temperature over the whole range of temperatures.

Figure 8:
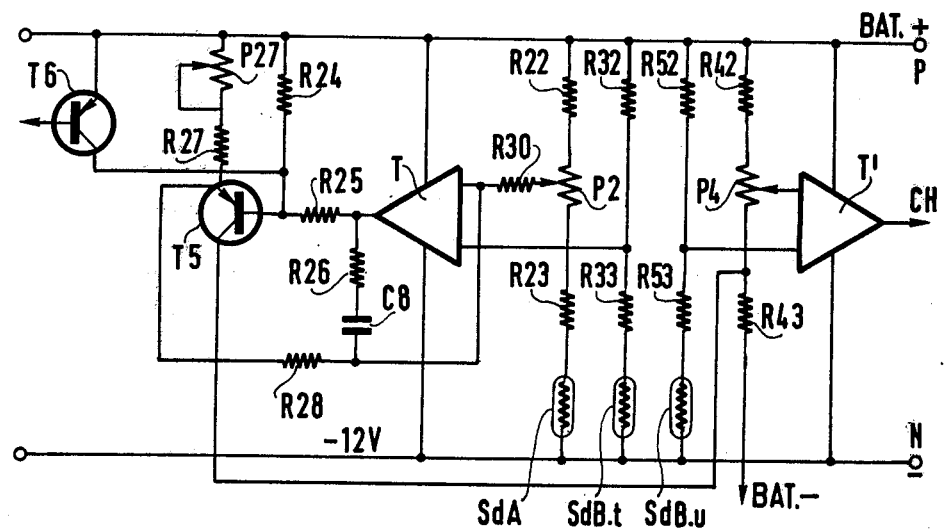
FIG. 8 is a circuit diagram of a device embodying the method shown in FIG. 7.
Figure 9:
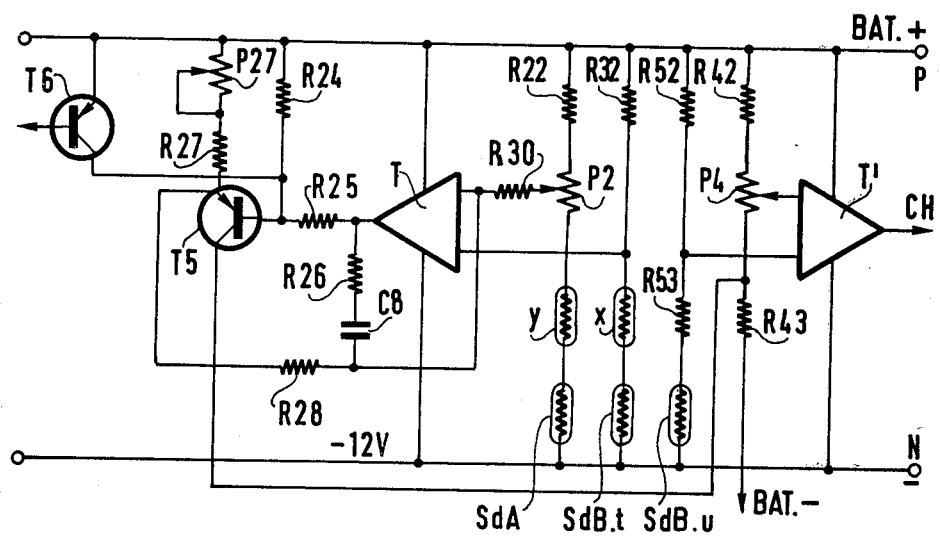
FIG. 9 is a circuit diagram of a device embodying a further variant of the method according to the invention.

FIG. 9 shows a circuit diagram similar to that in FIG. 8 except that the probe S$d$B$u$ varies linearly with the temperature and resistors R 23 and R 33 have been respectively replaced by resistors Y and X which are linearly variable with temperature. The device of FIG. 9 makes it possible to obtain a variation in the charging voltage proportional to the variation in temperature of the battery with respect to time according to the equation $$V = -c\,[d(TB-TA)/dt] + d.$$

Figure 10:
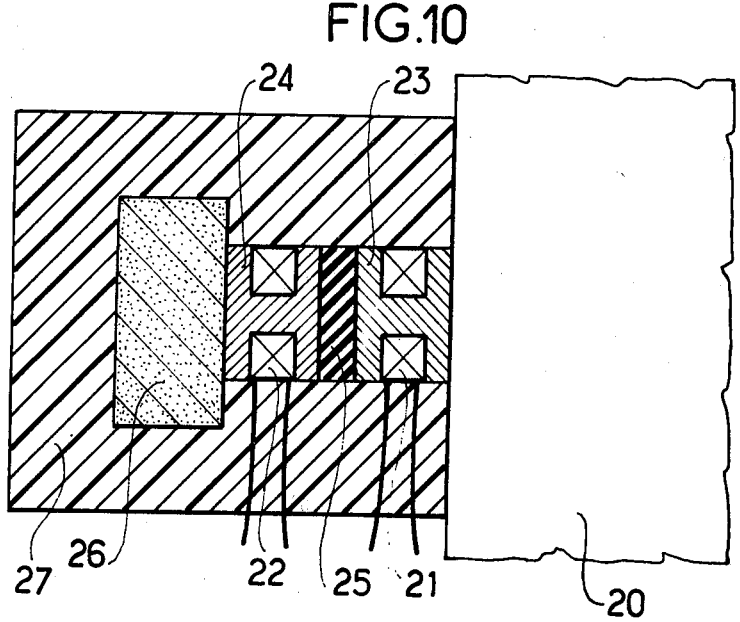
FIG. 10 is a diagrammatic sectional view of some of the components shown schematically in FIG. 9.

The resistors X and Y which are shown at 21 and 22 in FIG. 10 are identical. They are wound on copper bobbins 23 and 24 separated by a thermal insulator 25, X being in contact with a storage battery 20 and Y being in contact with a thermal mass 26. The resistors, thermal insulator 25 and thermal mass are surrounded with a thermal insulator 27. In this embodiment, resistor Y reaches the temperature which the battery (and resistor X) had at the time $t$, at a later time designated by $t+\Delta t$. Resistor Y has a difference in temperature with respect to resistor X which becomes relatively more important as the rate of variation of temperature increases. Thus, voltage correction is no longer a direct function of the temperature, but a function of the rate of variation in temperature. The divider including S$d$B$u$ is still independent of the dividers including the resistors X and Y in this embodiment in order to avoid modifying the correction slope of the battery voltage as a function of temperature. It would nevertheless be possible to revert to a common divider if the values of the resistances of the temperature probes are modified. Likewise, the temperature probe S$d$B$u$, which would be constituted by X, could be dispensed with.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. In a method of charging a storage battery that includes sensing battery temperature and ambient temperature, comparing the sensed temperatures to determine their difference, and providing a first charging voltage varying as a first inverse function of battery temperature defining a first high charging rate in a first temperature range in which battery temperature does not exceed ambient temperature by more than a first temperature difference, wherein the improvement comprises:
providing an intermediate charging voltage varying as a second inverse function of battery temperature defining an intermediate charging rate in an intermediate temperature range in which the battery temperature exceeds ambient temperature by at least said first temperature difference but by less than a second temperature difference that is greater than the first temperature difference, wherein at each battery temperature the voltage of said intermediate charging rate is less than the value of the first function at the same temperature by an amount that varies as a function of the battery temperature.

2. The method of claim 1 further comprising providing a second charging voltage in a second temperature range in which the battery temperature exceeds ambient temperature by at least said second temperature difference, wherein the second charging voltage at each battery temperature is lower than the value of the first function at the same temperature by a constant amount and wherein the intermediate voltage decreases from a value equal to the first charging voltage at the lower limit of the intermediate temperature range to a value equal to the second charging voltage at the upper limit of the intermediate temperature range.

3. The method of claim 1 comprising a cut-out of charging when the battery temperature exceeds the upper limit of the intermediate temperature range.

4. The method of claim 1 wherein the difference between the first and intermediate charging voltages at the same temperature in the intermediate temperature range varies linearly with the difference between battery temperature and ambient temperature.

5. The method of claim 1 wherein the first charging voltage varies linearly with battery temperature.

6. The method of claim 2 wherein the second charging voltage varies linearly with battery temperature.

7. The method of claim 1 wherein the first charging voltage varies linearly with the time rate of change of the difference between battery temperature and ambient temperature.

8. The method of claim 2, wherein the second charging voltage varies linearly with the time rate of change of the difference between battery temperature and ambient temperature.

9. The method of claim 1 wherein the first temperature difference is zero.

10. The method of claim 1 further comprising the step of preventing charging at the first charging rate after the expiration of a predetermined time from the start of charging.

11. In storage battery charging apparatus that includes means for sensing battery temperature and ambient temperature and means responsive to said sensed temperatures for providing a first charging voltage varying as a first inverse function of battery temperature defining a first high charging rate in a first temperature range in which the battery temperature does not exceed ambient temperature by more than a first temperature difference, the improvement comprising:
means for providing an intermediate charging voltage varying as a second inverse function of battery temperature defining an intermediate charging rate in an intermediate temperature range in which the battery temperature exceeds ambient temperature by at least said first temperature difference but by less than a second temperature difference that is greater than the first temperature difference, wherein at each battery temperature the voltage of said intermediate charging rate is less than the value of the first function at the same temperature by an amount that varies as a function of the battery temperature.

12. Apparatus according to claim 11 further comprising means for providing a second charging voltage defining a second low charging rate in a second temperature range in which the battery temperature exceeds ambient temperature by at least said second temperature difference, wherein the second charging voltage at each battery temperature is lower than the value of the first function at the same temperature by a constant amount and wherein the intermediate voltage decreases from a value equal to the first charging voltage at the lower limit of the intermediate temperature range to a value equal to the second charging voltage at the upper limit of the intermediate temperature range.

13. Apparatus according to claim 11 further comprising means for providing a cut-out of charging when the battery temperature exceeds ambient temperature by at least said second temperature difference.

14. The apparatus of claim 11 wherein the difference between the first and intermediate charging voltages varies linearly with the difference between the battery temperature and ambient temperature.

15. The apparatus of claim 11 wherein the means for providing a first charging voltage provides a voltage which varies linearly with the difference between battery temperature and ambient temperature.

16. The apparatus of claim 12 wherein the means for providing a second charging voltage provides a voltage which varies linearly with the difference between battery temperature and ambient temperature.

17. The apparatus of claim 11 wherein the means for providing a first charging voltage provides a voltage which varies linearly with the time rate of change of the difference between battery temperature and ambient temperature.

18. The apparatus of claim 12 wherein the means for providing a second charging voltage provides a voltage which varies linearly with the time rate of change of the difference between battery temperature and ambient temperature.

19. The apparatus of claim 11 further comprising preventing means for preventing charging at the first charging rate after the expiration of a predetermined time from the start of charging.

20. The apparatus of claim 11 wherein the sensing means comprise temperature sensitive resistance elements.

21. Apparatus according to claim 11 wherein the means for providing a first voltage, the means for providing an intermediate voltage, and the means for providing a second voltage comprise a first difference amplifier including bias means and having input connections to the means for sensing the battery temperature and ambient temperature, the first difference amplifier being operative to provide an output equal to said first voltage in the first temperature range, said intermediate voltage in the intermediate temperature range, and said second voltage in the second temperature range.

22. The apparatus of claim 21 further comprising charger control means and charger output means, and wherein the means for providing first intermediate and second charging voltages further comprise a second difference amplifier including bias means and having one input connected to the sensing means and one input connected to the output of the first difference amplifier, the output of the second difference amplifier being connected to the charger control means whereby the charger output means provides the first and intermediate charging voltages.

23. The apparatus of claim 22, wherein the sensing means comprise a plurality of temperature sensitive resistance elements.

24. The apparatus of claim 11 wherein the sensing means comprise first, second and thrid temperature sensitive resistance elements and the means for providing first, intermediate, and second charging voltages comprise a first voltage supply having one supply line connected to a terminal of like polarity of the battery being charged, first and second voltage dividers and a first difference amplifier having first and second inputs connected respectively to the first and second voltage dividers which are connected across the first voltage supply, the first divider including the first temperature sensitive resistance element for providing a measure of the battery temperature, and the second divider including the second temperature sensitive resistance element providing a measure of ambient temperature, third and fourth voltage dividers and a second difference amplifier having a first input connected to the third voltage divider which is connected across the terminals of the battery and a second input connected to the fourth voltage divider which is connected across the first voltage supply and which includes the third temperature sensitive resistance element for providing a measure of the battery temperature, charger means including control means therefor to which the output of the second difference amplifier is connected, whereby the first and intermediate charging rates are determined.

25. The apparatus of claim 24, wherein the fourth voltage divider and the first voltage divider are common and wherein the first and third temperature sensitive resistance elements are common.

26. The apparatus of claim 25, wherein the first, second and third resistances vary linearly with temperature.

27. The apparatus of claim 21 wherein the first difference amplifier is operative to provide an intermediate voltage which varies inversely with the difference between the battery temperature and ambient temperature in the intermediate temperature range.

28. The apparatus of claim 21 wherein the first difference amplifier is operative to provide an intermediate voltage which varies linearly with the difference between battery temperature and ambient temperature in the intermediate temperature range.

29. The apparatus of claim 24, wherein the third temperature sensitive resistance element varies non-linearly with temperature while the first and second temperature sensitive resistance elements vary linearly with temperature.

30. The apparatus of claim 24, wherein the first voltage divider further comprises a fifth temperature sensitive resistance element in direct contact with the battery and the second voltage divider further comprises a sixth temperature sensitive resistance element identical to the fifth temperature sensitive resistance element and situated in contact with a thermal body close to the battery but so insulated therefrom such that the sixth resistance element follows the temperature of the battery with a delay.

31. The apparatus of claim 19, wherein the preventing means comprises delay means for generating a delay proportional to the magnitude of the previous discharge of the battery.

* * * * *

UNITED STATES PATENT AND TRADEMARK OFFICE
CERTIFICATE OF CORRECTION

PATENT NO. : 4,125,802
DATED : 14 November 1978
INVENTOR(S) : Pierre Godard

It is certified that error appears in the above—identified patent and that said Letters Patent are hereby corrected as shown below:

Column 1, line 56: change "temperatures" to --temperature--.

Column 2, line 18: change "=b" to -- +b--.

Column 10, line 2: change "thrid" to --third--.

Signed and Sealed this

Twelfth Day of June 1979

[SEAL]

Attest:

RUTH C. MASON
Attesting Officer

DONALD W. BANNER
Commissioner of Patents and Trademarks